(12) United States Patent
Braconnier et al.

(10) Patent No.: US 6,208,128 B1
(45) Date of Patent: Mar. 27, 2001

(54) APPARATUS AND METHOD OF CONTINUOUSLY MEASURING THE WEAR OF A WALL OF A METALLURGICAL VESSEL

(75) Inventors: Franck Braconnier; Anne Dez, both of Plappeville; Claude Grisvard, Saulny; Daniel Pernet, Metz, all of (FR)

(73) Assignee: Sollac, Puteaux (FR)

( * ) Notice: Subject to any disclaimer, the term of this patent is extended or adjusted under 35 U.S.C. 154(b) by 0 days.

(21) Appl. No.: 09/255,776

(22) Filed: Feb. 23, 1999

(30) Foreign Application Priority Data

Feb. 27, 1998 (FR) .................................................. 98 02575

(51) Int. Cl.$^7$ ............................. G01N 27/00; G01R 27/08
(52) U.S. Cl. ......................................... 324/71.2; 324/700
(58) Field of Search .................................. 324/71.2, 700; 205/775.5–777; 29/825

(56) References Cited

U.S. PATENT DOCUMENTS

| | | | |
|---|---|---|---|
| 3,609,549 | * 9/1971 | Hausler et al. | 324/700 |
| 4,587,479 | * 5/1986 | Rhoades et al. | 324/700 |
| 4,724,428 | * 2/1988 | Brown, Jr. | 340/653 |
| 5,158,366 | 10/1992 | Nagai et al. | |
| 5,711,608 | 1/1998 | Finney . | |

FOREIGN PATENT DOCUMENTS

| | | |
|---|---|---|
| 0 363 902 | 4/1990 | (EP) . |
| 0 764 837 | 3/1997 | (EP) . |
| 2 008 582 | 1/1970 | (FR) . |
| 2 504 420 | 10/1982 | (FR) . |
| 2 728 336 | 6/1996 | (FR) . |
| 59-185713 | 10/1984 | (JP) . |
| 62-080216 | 4/1987 | (JP) . |
| 5-264366 | 10/1993 | (JP) . |

OTHER PUBLICATIONS

French Search Report.

* cited by examiner

*Primary Examiner*—Safet Metjahic
*Assistant Examiner*—Anjan K Deb
(74) *Attorney, Agent, or Firm*—Nixon Peabody LLP; Thomas W. Cole

(57) ABSTRACT

A probe is provided for measuring the wear of a wall in a metallurgical vessel. The probe includes at least two electrically conducting elements which extend generally mutually parallel, and a tubular sheath wherein the electrically conducting elements extend interiorly of said sheath, and are mutually insulated via a refractory insulator. The probe is adapted to be implanted in the transverse direction in the wall of a metallurgical vessel with the distal end of each of the two electrically conducting elements being disposed at the interior surface of said wall. A measurement system is connected to the opposite proximal ends of the electrically conducting elements for measuring an electrical characteristic of the circuit formed by said elements that depends on the length of the elements. The probe has a diameter less than 1 mm achieved by stretching after the components have been assembled into an intermediate assembly having a larger cross sectional area than the final cross section.

14 Claims, 3 Drawing Sheets

APPARATUS AND METHOD OF CONTINUOUSLY MEASURING THE WEAR OF A WALL OF A METALLURGICAL VESSEL

BACKGROUND OF THE INVENTION

The invention relates generally to measurement of the wear of a wall of a metallurgical vessel. The word "wall" as used here refers to any body comprised of refractory material which is susceptible to be progressively consumed when in contact with fused metal contained in the vessel. The invention may thus be employed for continuously measuring: the wear of a refractory lining, or the wear of organs implanted in a refractory lining (e.g. tuyeres for oxygen injection in a converter), or the wear of elements for injecting agitation gas, or the wear of bottom electrodes in an electric arc furnace.

Consider the example of tuyeres disposed in the lining of a converter, which tuyeres traverse the wall of the converter and serve for injection of a treatment fluid, which may be a gas (e.g. oxygen) or a liquid, into the fused metal, which metal contacts the tuyeres during the treatment. It turns out that the erosion of the refractory material is particularly high in the neighborhood of the zones of injection of the gas (or liquid) into the vessel, which injection occurs at the outlets of the tuyeres. One reason why it is particularly desirable to be able to monitor, as accurately as possible, the advance of such erosion, is that such knowledge enables one to take into account the influence of the erosion pattern itself on the parameters of the injection of the fluid. Another reason is that erosion of the refractory material of and near the tuyeres is difficult to predict, and thus monitoring is important in order to avoid the risk of failure of the lining and the vessel wall or tuyere structure.

Accordingly, there have long been efforts to provide means of measuring the wear of refractory materials by measuring the variation in the thickness of the wall formed by or with said materials.

One early technique consists of implanting in the refractory material of the lining, or of the tuyeres, a plurality of thermocouples at various depths in the direction of propagation of the wear, i.e., generally at various depths in the direction of the thickness of the refractory material. This technique has been used, e.g., for tuyeres comprised of permeable refractory elements of the type known as "LBE," as described in Fr. Pat. 2,518,240. The advance of the erosion is monitored via the signals from the different thermocouples implanted in a given permeable element, wherewith a sharp change in the signal indicates that the metal has arrived in contact with a given thermocouple junction in consequence of erosion of the refractory material surrounding said junction. This method of monitoring wear is necessarily discrete or stepwise, in that a new wear signal does not appear until the wear of the refractory advances by a distance through the thickness thereof which distance equals the separation of two thermocouples in the thickness direction.

More recently, instrument makers have proposed apparatuses which aim to achieve continuous measurement by continuously measuring the electrical resistance of a resistive wire disposed in the refractory material, which wire extends in the direction of the thickness of said refractory material. As the refractory material is eroded, the length of the resistive wire is reduced, along with its electrical resistance. Thus, measuring the resistance enables one to monitor the change in thickness of the refractory material resulting from erosion of the refractory material. In practice, the device employed for continuously measuring the length of an injection tuyere, such as described in Fr. Pat. 2,728,336, is a probe comprised of two electrical conductors extending parallelly and separated by an electrically insulating refractory material. The two conductors are connected to means of measuring electrical resistance capable of measuring the variations in resistance resulting from variations in the length of the conductors as the refractory lining of the metallurgical vessel is eroded, wherewith closure of the circuit is provided by the fused metal itself contained in said vessel. At least one of the two conductors is comprised of a material having sufficient resistivity to enable practicable and accurate measurement. Such probes are used principally for measuring wear at fluid-injection tuyeres, in that, in practice, it is necessary to have substantial movement of fused metal such as occurs near the end of the tuyere in order to disturb the deposit of electrically insulating dross present on the wall, and thereby to ensure good electrical connection between the ends of the two conductors.

According to a preferred embodiment described in the above-cited Fr. Pat. 2,728,336, the probe is in the form of a coaxial cable having a central conductor surrounded by an insulating sleeve comprised of an electrically insulating refractory material, e.g., alumina, which sleeve is in turn surrounded by a metal sheath comprised of, e.g., steel or Inconel®, which sheath serves as the second conductor and provides a strong structure for the probe. The central conductor, comprised of, e.g., a steel-based material or a material based on molybdenum bi-silicide, has a resistance per unit length on the order of, e.g., 45 ohm/m, which is appreciably greater than that of the metal sheath.

The method of fabrication according to the state of the art leads to a probe having an external diameter of c. 1.5 mm; the insulating sleeve comprised of alumina, consisting of tubular elements disposed interiorly of the metal sheath, is quite thick, having a thickness on the order of several tenths of a millimeter. Such probes have low flexibility and are ill suited for implantation into difficultly accessible locations, e.g. tuyeres of converters. Moreover, the distance between the central conductor and the exterior metal sheath is such that there is no assurance that a good electrical link will be provided between them via the fused metal contained in the vessel. Defects in this electrical link result in errors in the measurement of the resistance, and thereby of the erosion, in that fluctuations in the resistance measured do not correspond to changes in the length of the central conductor.

It may even be impossible to employ such a probe where one desires to measure the erosion of a refractory material in a region of the vessel having a continuous refractory lining, because the insulating layer of dross covering the surface of the refractory bricks quasi-permanently interferes with electrical linkage of the two conductors in the probe.

SUMMARY OF THE INVENTION

The object of the present invention is to solve the aforementioned problems wherein one achieves a reliable measuring probe which is easily implantable even in difficultly accessed locations and which enables more accurate measurement than according to the state of the art. A further object of the invention is an embodiment which enables measurement of the wear of a refractory material even when the interior surface of the lining is covered with an insulating layer. Another object of the invention is an embodiment which enables measurement of the temperature at the level of the surface of the wall where the described probe is implanted.

Taking into account these objects of the invention, the principal claimed matter of the invention comprises an apparatus for continuously measuring the wear of a wall of a metallurgical vessel, which apparatus comprises:

- a probe, comprised of at least two electrically conducting elements which extend generally mutually parallel at a close mutual separation;
- a tubular sheath, which may consist of one of the said electrically conducting elements, wherewith the other electrically conducting element(s) extend interiorly of said sheath, said other element(s) being mutually insulated and insulated from said sheath via a refractory insulator, and wherewith the probe is adapted to be implanted in the transverse direction in said wall, with the distal end of each of the two elements being disposed at the interior surface of said wall, and
- measurement means connected to the proximal ends of the respective said electrically conducting elements for measuring an electrical characteristic of the circuit formed by said elements, which characteristic depends on the length of said elements;
- wherewith the probe has a diameter less than 1 mm, achieved by stretching (or other forming means) resulting in overall lengthening of the various components thereof, after said components have been assembled into an intermediate assembly having a larger cross sectional area than the final cross section.

The diameter of the probe is preferably less than 0.5 mm, particularly preferably less than or equal to 0.2 mm.

Thus, the inventive probe has a diameter appreciably less than that of known probes. The smaller diameter facilitates the installation of the probe in difficultly accessible locations.

According to a first exemplary embodiment, particularly adapted to measuring the wear of tuyeres, at least one of the two said electrically conducting elements is comprised of a material with high resistivity, and the measurement means are means of measuring electrical resistance, whereby one measures the resistance of the circuit formed by the said electrically conducting elements, which circuit is completed at the level of the distal ends of said elements via fused metal contained in the vessel. The term "high resistivity" is understood to mean sufficient resistivity that the variations in the length of the conductors result in variations in electrical resistance which can be detected and measured with sufficient precision by the said measurement means.

In the embodiment described immediately, supra, the general principle of measurement is similar to that described hereinabove as applicable to known systems. The essential advantage afforded by the invention is that the short distance between conductors ensures good completion of the circuit at the ends of the conductors which are in contact with the fused metal.

The material with high resistivity is chosen such that, after the described lengthening operation, its electrical characteristics are essentially constant over the entire length of the element comprised of said material. In other words, a material is chosen which has mechanical properties which are amenable to homogeneous deformation during the stretching (or other lengthening operation). A suitable such material may be, e.g., chromel or alumel. (These particular materials cited as examples are classically employed in fabrication of thermocouples.)

Preferably, the materials of which the electrically conducting elements are comprised are chosen from among materials having a resistivity which is generally constant with temperature, or which at least does not vary substantially over the range of temperatures envisioned for the given application of the apparatus. It is noted that, for the particular application consisting of measurement of the wear of a tuyere in a converter, the temperature at the surface in contact with the fused metal is very high—c. 1300–1500° C.—but decreases rapidly in the interior of the refractory lining, such that several millimeters below the surface of said lining it does not exceed c. 500° C. In addition, because the probe is implanted close to the passages in which the injected fluid flows, the probe is appreciably cooled by said fluid.

The choice of the material for the electrically resistive element(s) generally involves a compromise between, on the one hand, the desired electrical properties (particularly, a sufficiently high resistivity per unit length, on the order of 40–120 ohm/m or greater, and a low temperature coefficient of variation of the resistivity), and, on the other hand, the desired mechanical properties (particularly, deformability to allow the stretching or other lengthening operation). As mentioned above, a suitable material may comprise:

- chromel or alumel, or
- an alloy of steel with molybednum bi-silicide (having advantageous electrical characteristics, particularly a temperature coefficient of variation of resistivity which coefficient is low).

The tubular sheath is comprised of a metal which has generally good mechanical robustness characteristics, e.g. steel or Inconel®. As will be discussed further below, the sheath material may also be chosen for its electrical characteristics—either low resistivity so as to provide a return conductor of negligible resistance, or high resistivity so as to provide a resistive element contributing to the measurement circuit.

According to a particular embodiment, the materials of the electrically conducting elements of the measurement circuit are chosen so as to maximally avoid a thermocouple effect at the level of the distal ends in contact with the fused metal contained in the vessel. At the level of said ends, the link created between the two electrically conducting elements needs to be appreciably conductive in order to be able to properly complete the circuit for measurement of the resistance and to maintain the correctness of the determinations of length variations of the said elements which determinations are derived from the resistance measurements. Theoretically, a suitable such link is provided by the fused metal in the vessel. In practice, a zone occurs which is more or less paste-like and semi-solidified, resulting from the combination of the erosion of the refractory material, the fusion of the conductors themselves, and the cooling caused by the injection of the gas from the tuyere. It is this zone which is relied upon for directly linking the two conducting elements. To avoid perturbing the measurement by a thermoelectric effect within said link, the materials present should be minimally susceptible to generation of an electromotive force (emf) by the Seebeck effect, which emf might distort the predictable relationship between the resistance measured and the length of the conductors.

According to another embodiment, a pair of materials is used which is intentionally selected so as to generate a thermally derived emf, wherewith the zone of linkage between the distal ends of the electrically conducting elements will constitute a hot junction zone of a classical thermocouple. The objective is to measure the temperature, not necessarily with high accuracy, but to a sufficient approximation that one can apply a correction to the values of the length determined by the resistance circuit, which correction derives from the variations in resistivity with temperature, of the electrically conducting elements. One may use the probe to alternately measure temperature and resistance in a regular succession of measurements. The results of the temperature measurements will then be used to:

directly correct the measurements of resistance, by taking into account the presence, in the resistance-measuring circuit itself, of an emf generator comprised of the hot thermocouple junction; and correct the values of length calculated, viz. by taking into account any variations in the resistivity attributable to the temperature profile.

According to a second exemplary embodiment, intended particularly for cases in which one cannot reliably achieve a link between the two conductors, the measurement means comprise means of measuring the capacitance between the two conductors. Erosion of the refractory material results in shortening of the conductors, which thus decreases or varies the natural electrical capacitance between said two conductors which extend in mutual close proximity. It is seen that here too the small diameter of the probe is advantageous, in that a very close separation of the conductors may be achieved, and thereby higher variability of the capacitance with the length of the conductors.

The refractory insulator used is preferably a magnesium oxide powder; this powder is compacted during the stretching or other lengthening operation whereby the diameter of the probe is reduced. In the above-described prior art probe, the insulation consisted of a sleeve comprised of alumina; this sleeve was in the form of a fine capillary which was inherently fragile and for this reason difficult to work with.

The design and composition of the inventive probe enables production of a probe with a diameter less than 0.5 mm but having high flexibility during fabrication and use. Accordingly, probes of length 2 meter and more can be fabricated, and because of their flexibility they can be implanted in difficultly accessible locations.

According to a particularly advantageous embodiment, a thermocouple, e.g., a chromel-alumel thermocouple, is employed as a probe. (Such thermocouples are readily available commercially, in substantial lengths and small diameters, as low as 0.2 mm.) This provides a ready-made probe having two electrically conducting resistive elements disposed in a sheath which sheath affords a third element which may be made part of the measurement circuit, which opens up a variety of possibilities. Some of these will be discussed in the following description of exemplary embodiments of the inventive apparatus and the inventive method in the course of which other characteristics and advantages of the invention will become apparent.

DETAILED DESCRIPTION OF THE PREFERRED EMBODIMENT

Figure 1:
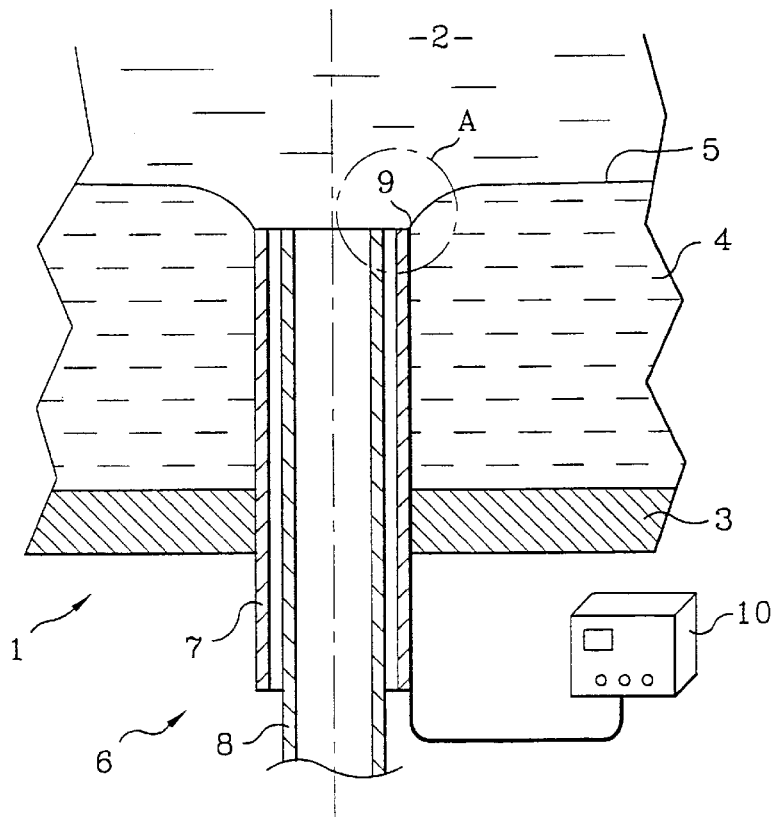
FIG. 1 illustrates a classical means of continuously measuring the wear of a wall of a metallurgical vessel, showing the probe implanted in the refractory wall of a metallurgical reactor, at the level of a tuyere for gas injection.

In FIG. 1, the bottom wall 1 of a metallurgical reactor, e.g., a steelmaking converter, containing fused metal 2, is shown schematically. The wall 1 is comprised of a metal shell 3 lined by a layer 4 of refractory material the surface 5 of which is in contact with the liquid metal. A plurality of tuyeres 6 are provided in the wall 1, which tuyeres are adapted for injecting treatment fluids, e.g. oxygen or other gases, into said metal.

In classical fashion, such a tuyere comprises one or more concentric tubes 7, 8 which open out in the interior of the vessel at the general level of the internal surface 5 of the refractory lining 4.

In known fashion, the probe 9 is disposed parallelly to the tuyere, preferably externally thereof in a groove which may be formed in the exterior tube 7 of the tuyere for the purpose of accommodating the probe. The probe extends over the entire length of the tuyere, or at least along the entire useful length thereof, i.e., from the internal surface 5 to the exterior of the vessel, from which the probe is connected to a measurement system 10.

Figure 2:
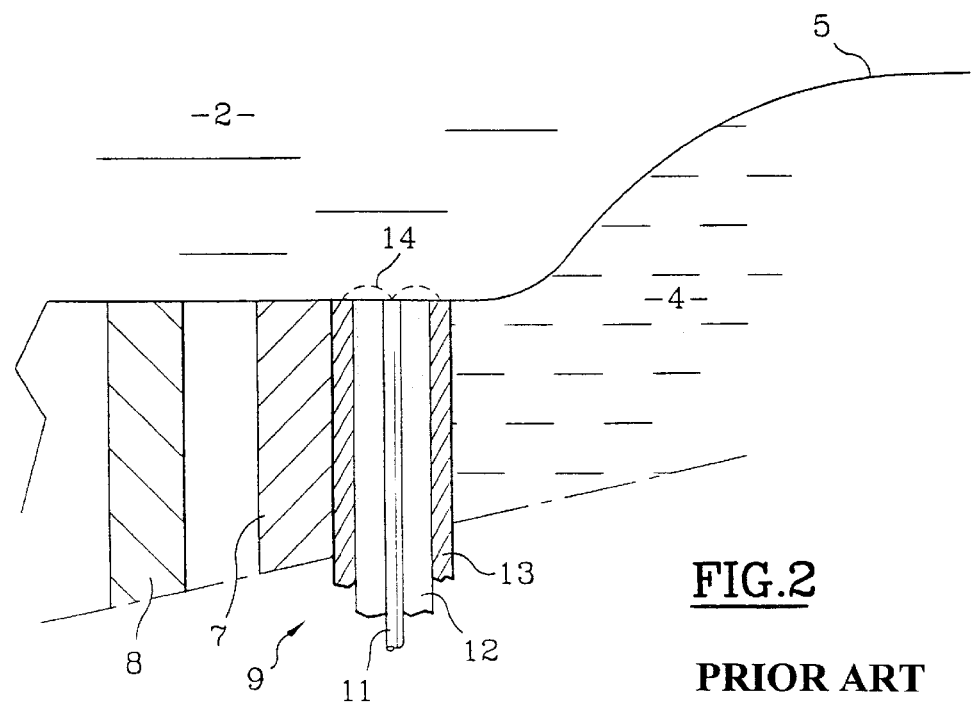
FIG. 2 is an enlarged detail view of region A of FIG. 1, showing the end of the probe in contact with the molten metal, and illustrating the electrical link between the ends of the conductors via the molten metal contained in the reactor.

FIG. 2 is an enlarged detail view of the end of a probe terminating at the internal surface 5 of the refractory lining 4, at a stage when the probe and the tuyere have suffered a certain amount of erosion leading to shortening of the length of the probe. FIG. 2 also illustrates the electric current lines 14 providing a link between the ends of the central conductor 11 and the tubular sheath 13 of the probe 9 via the fused metal 2. An insulator 12 is disposed between the conductor 11 and the sheath 13. Thereby, in known fashion, one can employ the measuring system 10 to measure the resistance of the circuit comprising the central conductor and the tube 13, from which the length of the probe can be deduced.

The embodiments just described are known in the art. The first exemplary embodiment of the invention relates to these embodiments. Because the diameter of the inventive probe can be very small, in particular <0.5 mm, the groove for accommodating the probe may not be necessary.

Figure 3:
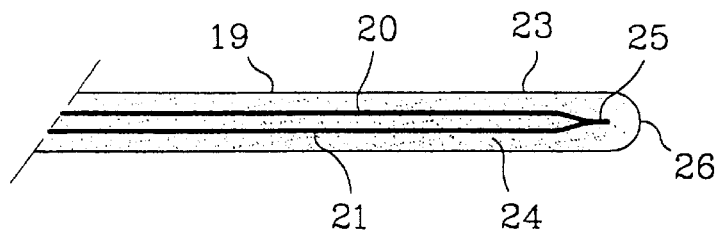
FIG. 3 is an enlarged partial view of an inventive probe.

According to a preferred embodiment illustrated in FIG. 3, the inventive probe 19 is comprised of a chromel-alumel thermocouple of a customary type which is commercially available in diameters ≦0.5 mm and substantial lengths of up to several meters. The thermocouple has a tubular sheath 23, comprised of, e.g., steel, with two parallel wires 20, 21 extending in the interior of said sheath, which wires form the thermocouple proper. The wires (20, 21) are mutually insulated, and insulated with respect to the sleeve 23, by means of a refractory insulator which may comprise powdered alumina. It is known that such thermocouples are classically fabricated by assembling the various components of the thermocouple as recited supra, wherewith initially the assembly has a cross sectional area appreciably greater than that of the finished thermocouple. The broader initial assembly allows the wires and sheath to be positioned at mutual separations which are generally constant over the entire length of said components. The assembly is then stretched (or subjected to another lengthening operation), wherewith simultaneously its cross section is reduced until the diameter of the sheath reaches a desired value; in this process, the conductors are also stretched (or otherwise lengthened), with corresponding reduction of their cross sections, but the mutual insulation between the conductors, and the insulation between the respective conductors and the sheath, which insulation is provided by the powdered insulating refractory material, is preserved.

In FIG. 3, the probe is illustrated in its newly fabricated form prior to any use. The ends of the wires 20, 21 are connected by a junction 25 comprising a classical thermocouple junction. The distal end 26 of the sheath 23 is closed off near the junction 25. This probe can be implanted in the manner of the conventional probe 9 illustrated in FIG. 1.

Figure 4:
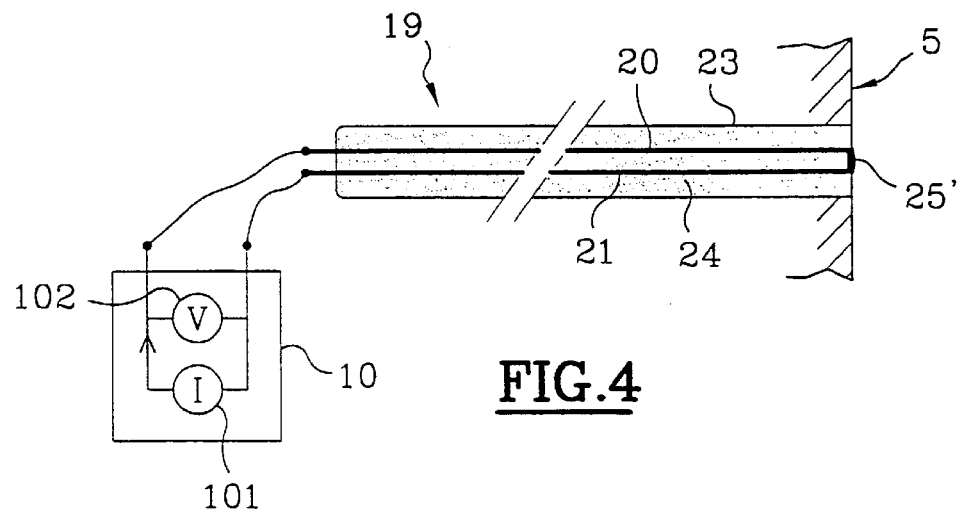
FIG. 4 is a schematic view of the probe and the other measurement instrumentation according to a first embodiment of the invention, using resistance measurement.

FIG. 4 illustrates schematically a first variant of the first exemplary embodiment of the apparatus. The wires 20, 21 of the probe are connected to the measurement system 10, which measures the resistance of the electrical circuit comprised of the two wires 20, 21 which are connected in series at their distal ends 25' contacting the fused metal contained in the metallurgical vessel. After a certain amount of use leads to erosion of the refractory lining 4 and the tuyere 6, the distal end 26 of the probe has itself been eroded away, such that the sheath 23 and the two wires 20, 21 are now disposed at the internal surface 5 of the wall, in contact with the fused metal, analogously to the situation illustrated in FIG. 2. However, with the embodiment according to FIG. 4, because the two wires 20, 21 are disposed at a very close mutual separation, the lines of current between the wires do not actually pass through the fused metal, but rather a relatively fresh junction 25' is formed between the ends of said wires. This junction is comprised of metal of a more or less paste-like consistency, which furnishes electrical continuity between the two wires. This junction is regenerated automatically in the course of use by congealing of fused metal in contact with the refractory lining (or with the elements of the tuyere) surrounding the probe. In addition to supplying electrical continuity of the circuit, the junction 25' serves as a substitute for the original hot junction 25 of the thermocouple, and can function equivalently to said original junction; i.e., although the ersatz junction 25' may not necessarily furnish an accurate or precise measurement of the temperature, it does provide at least an approximation which can be used to correct the measured values of resistance so as to take into account variations in resistivity of the wire (or wires) as a function of temperature.

A current-generator 101 and a voltmeter 102 are shown schematically in the measurement system 10 of FIG. 4.

By measuring the voltage V while the current I is maintained constant, one can calculate the resistance R of the circuit, or variations in the resistance, and thereby the length (or variations in the length) of the wires 20, 21, by the relation R=V/I.

If the current I generated by the current generator 101 is reduced to zero, the measurement apparatus functions like an ordinary thermocouple, providing a voltage $V_T$ representative of the temperature at the distal ends of the wires 20, 21.

With this arrangement, one can alternately in succession measure the voltage resulting from a predetermined current I generated by the current generator 101 and the voltage resulting with I=O (i.e., with the generator 101 open-circuited); and one can correct the resistance measurement to account for variations in the resistance as a function of the estimated temperature, in the manner indicated supra. Further, one can also correct the value of the voltage V measured under the influence of a generated current I to account for the emf generated in the circuit from the Seebeck effect at the junction 25'.

An apparatus such as described, which is simultaneously a probe for measuring wall thickness, and a thermocouple for measuring temperature, will generally function in the temperature range 0–1370° C., which generally encompasses the classical range needed in siderurgy as envisioned by the invention. With a classical chromel-alumel thermocouple, the resistance per unit length of the combination of the two wires in series is on the order of 120 ohm/m.

Figure 5:
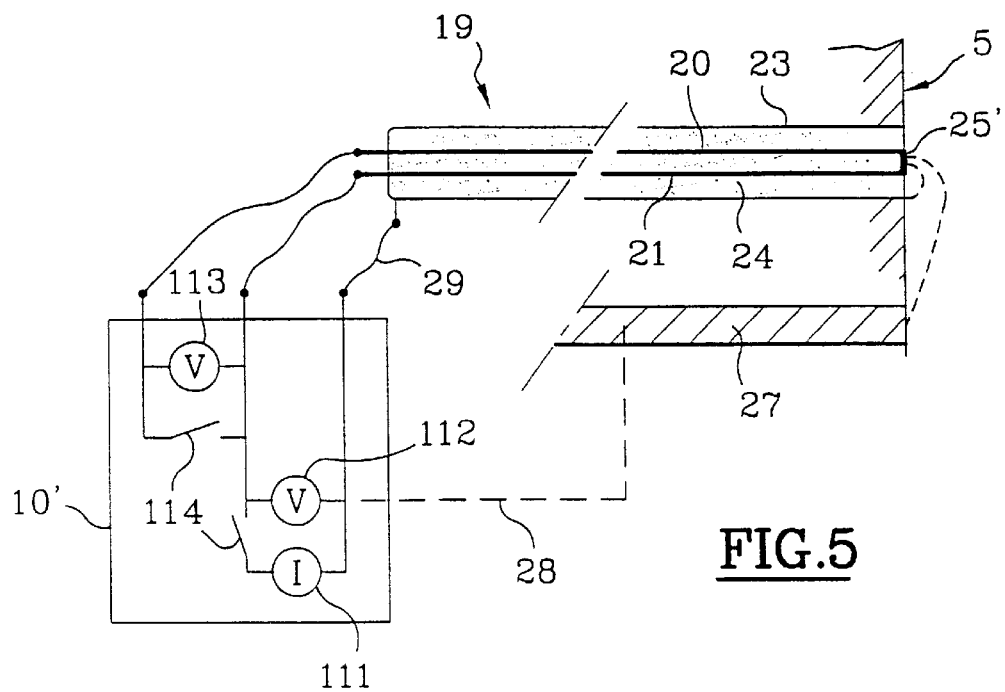
FIG. 5 illustrates a variant of the embodiment in FIG. 4.

FIG. 5 illustrates a different variant embodiment, also employing a small-diameter thermocouple as the probe; however here the measurement system 10' is different, and the connections of the measurement system to the probe are also different.

In this variant embodiment, the two wires 20, 21 of the thermocouple are connected to the measurement apparatus 10', and the sheath 23 is connected to the measurement apparatus as well. A current-generator 111 and a first voltmeter 112 are connected to one of the wires 21 and to the sheath 23, whereby one can measure the resistance of the circuit comprising the wire 21 and sheath 23, which wire and sheath are connected at their distal ends via fused metal, or via semi-solidified metal formed between said wire 21 and sheath 23. A second voltmeter 113 is connected between the two wires 20, 21, whereby one can approximately measure the temperature at the hot junction 25' in order to correct the resistance measurements in the manner indicated supra.

Connecting means, such as a two-pole switch 114, enable temporary short-circuiting of the two wires 20, 21. Under such short-circuiting, the resistance will be measured over a circuit comprised of the sheath 23 in series with a leg comprised of the two wires 20, 21 connected in parallel. This eliminates all perturbating influence of the thermocouple effect in measuring the resistance. The arrangement also enables one to correct this measurement of resistance by taking into account temperature-dependent variations in the resistivities of the conductors, such correction achieved with the aid of temperature measurements conducted with the switch 114 in open position.

FIG. 5 also represents a possible variant embodiment according to which, instead of using the sheath 23 as an element of the circuit for measuring the resistance, one uses a conductive body 27, e.g., a tube comprising a copper alloy, which tube is a component of the tuyere 6. This conductive body serves as a return conductor connected to the measuring system by a cable 28 (shown as a dashed line in FIG. 5); this is in lieu of the cable 29 which connects to the thermocouple sheath. This arrangement may also be used for the concept described above wherewith the two wires 20, 21 are mutually interconnected on the side of the measurement system, i.e., generally at their proximal ends. With the ends of the two wires 20, 21 being interconnected at the distal "external" end of the thermocouple, one obtains a very simple system where the two-pole switch 114, the voltmeter 113, and the connecting cable 29 can all be eliminated.

The advantages of using a thermocouple as a measuring probe include the relatively low cost of thermocouples, and the possibility of performing the measurements by the various methods indicated supra. Alternatively, the probe may comprise a single central conductor disposed in the sheath and insulated from the sheath by a powdered insulator (e.g., comprising powdered alumina); the powder will be compacted during the stretching (or other lengthening operation) carried out as part of the fabrication of the probe, as mentioned supra. It is not necessary that the central conductor be the conductive and resistive element of the probe; e.g., a possible alternative is for the sheath to be comprised of a material having appreciable electrical resistivity, wherewith the sheath can also (or exclusively) participate significantly in the change in resistance with the advancing erosion resulting in shortening of the sheath.

Figure 6:
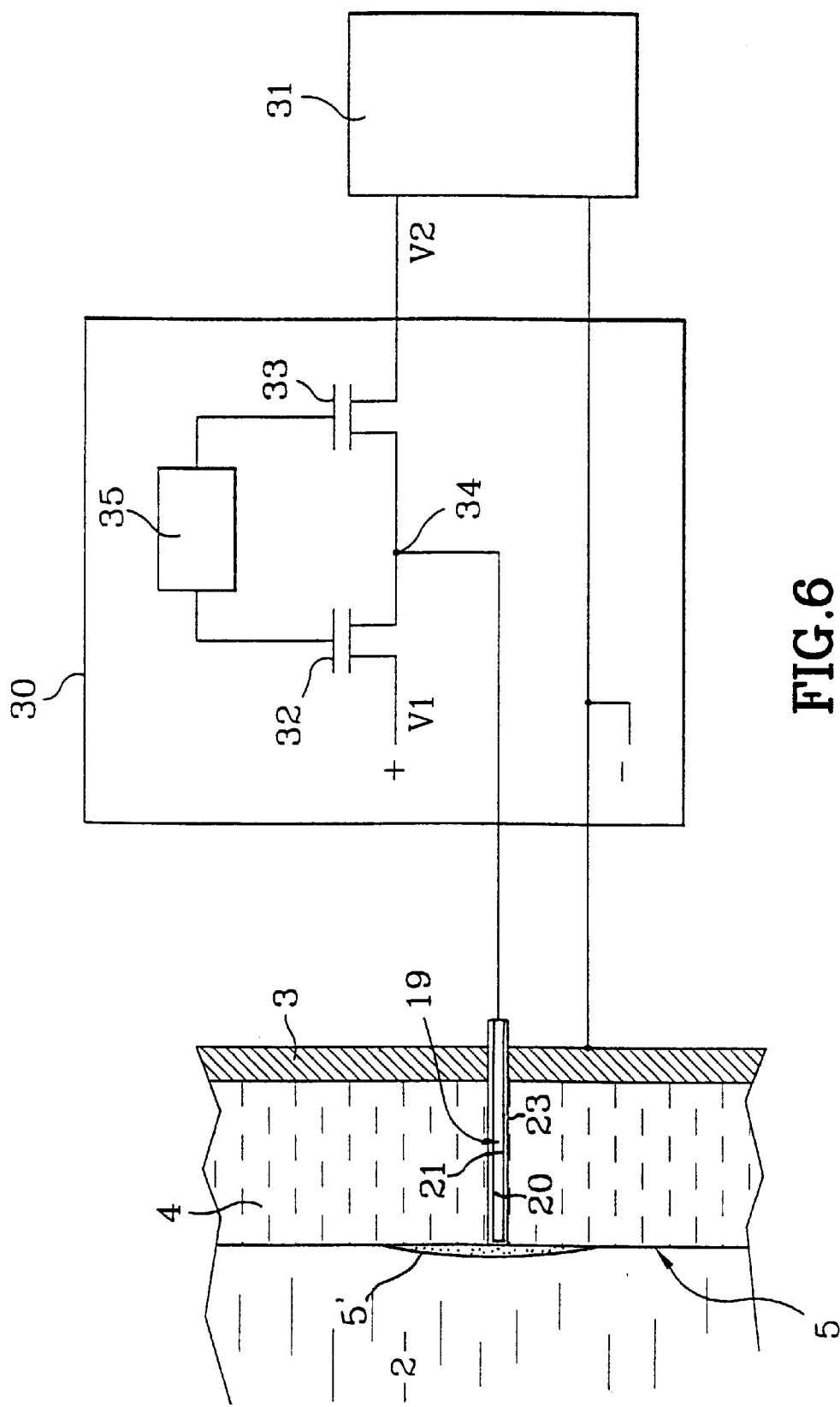
FIG. 6 illustrates the apparatus and measurement principle of a second embodiment, using capacitance measurement.

FIG. 6 illustrates a second exemplary embodiment of the invention, which is particularly intended for use for measuring the wear of a refractory lining in regions where it might not be possible to achieve electrical interconnection of the distal ends of the wires (or other conductors) of the probe. For example, such a region may be one in which the relevant wall zone is rapidly covered by an insulating layer of dross 5, which layer is continually renewed as the lining is further eroded. In the example illustrated, the two wires 20, 21 of the thermocouple of which the probe is comprised are interconnected and connected to a circuit 30 for processing a signal for measuring the natural capacitance between said wires 20,21 and the inconel sheath 23 (see FIG. 6) of the thermocouple 19 (Id.).

The sheath 23 is connected to ground. The circuit 30 is connected to computation means 31 for determining the length of the probe and thereby the thickness of the refractory lining.

The circuit 30 has two MOS transistors 32, 33 of which the first terminals are connected to a common node 34 to which the wires of the thermocouple are connected. A second terminal of transistor 32 is connected to a voltage source VI, and a second terminal of transistor 33 is connected to the computer 31. A clock device 35 which supplies a timing signal, e.g., at 20 mHz, serves to control the two transistors such that the capacitance formed by the thermocouple wires and the sheath (as described supra) is alternately charged at the voltage V1 via the transistor 32, and discharged across the computer circuit 31 via the transistor 33 at a voltage V2. The capacitance formed, which is switched between the potentials V1 and V2, thereby acts as an impedance, "equivalent resistance," in the circuit in which the potential ranges between V1 and V2, wherewith the value of the impedance is $$R=1/(C \cdot f_h),$$

where

C is the capacitance of the probe, and $f_h$ is the frequency of the clock 35.

The measurement of this resistance by the computer 31; or more properly, the measurement of the current in the circuit, enables one to calculate the capacitance of the probe, wherewith the resistance between the two wires of the thermocouple, and the sheath is assumed to be infinite.

Calibration leads to the ability to determine the length of the probe and thus the thickness of the refractory lining 4. As an example, for an impedance measured at 50 ohm, and a clock frequency of 50 Hz, the capacitance was found to be 1 nF.

It is seen that the small diameter of the probe in this embodiment is particularly advantageous in that the small spaces between the conductive components of the measured capacitance enable maximization of said capacitance.

What is claimed is:

1. An apparatus for continuously measuring the wear of a wall of a metallurgical vessel, comprised of:

a probe including at least two electrically conducting elements which extend generally mutually parallel, wherein one of said conducting elements includes a tubular sheath that contains the other of said conducting elements, and an insulator for mutually insulating said elements from one another within said sheath, wherein said elements have distal end means spaced apart from one another and substantially flush with said insulator of said sheath for contacting metal in said metallurgical vessel when said probe is mounted in said wall of said vessel, and a measurement system connected to proximal ends of the electrically conducting elements for measuring an electrical characteristic of a circuit formed by said elements, which characteristic is dependent upon the length of said elements, wherein the distal end of the probe has a diameter less than 1 mm.

2. An apparatus according to claim 1, wherein the probe has a diameter less than 0.5 mm throughout its length.

3. An apparatus according to claim 1, wherein at least one of the two aforesaid electrically conducting elements is formed from a material having a high resistivity, and said distal end means of said electrically conductive elements are flush with an inner wall of said vessel, and said measurement system measures electrical resistance of a circuit formed by said elements and metal contained in the vessel and disposed between said distal end means of said two electrically conducting elements, said metal providing an electrical link between said electrically conductive elements no longer than about 0.5 mm.

4. An apparatus according to claim 3, wherein the probe is formed from a thermocouple having two wires formed by the two electrically conducting elements.

5. An apparatus according to claim 3, wherein the probe is formed from a thermocouple having a sheath, and the measurement system for measuring resistance is connected between:

the electrically conducting elements, and the sheath of the thermocouple.

6. An apparatus according to claim 5, wherein the measurement system includes a connector for temporarily electrically connecting the two electrically conducting elements to short circuit said conducting elements.

7. An apparatus according to claim 1, wherein the measurement system includes a circuit for measuring the capacitance between the electrically conducting elements of the probe.

8. A method for continuously measuring the wear of a wall of a metallurgical vessel employing a thermocouple having two wires mutually insulated from one another in a sheath, said wires having spaced apart distal ends substantially flush with said sheath and substantially flush with an inner surface of said vessel wall, comprising the steps of measuring a resistance of a circuit including the two wires of the thermocouple, and measuring an electromotive force generated by a junction formed at the distal ends of said two wires in contact with liquid metal contained in the vessel wherein said resistance measuring and electromotive force measuring steps are alternatively conducted, and correcting the measured resistance as a function of the alternately measured value of said resistance and emf.

9. A method of continuously measuring the wear of a wall of a metallurgical vessel employing a thermocouple having two wires mutually spaced apart from one another in a sheath formed from an electrically conducting material, said wires having spaced apart distal ends substantially flush with said sheath and substantially flush with an inner surface of said vessel wall, comprising the steps of:

measuring a resistance of a circuit including at least one of the two thermocouple wires, and the electrically conducting sheath, and measuring an emf generated by a junction formed at the ends of the two wires in contact with the liquid metal contained in the vessel, wherein said resistance measuring and electromotive force measuring steps are alternatively conducted, and correcting the measured resistance as a function of the alternately measured resistance and emf.

10. A method of fabricating an apparatus for continuously measuring the wear of a wall of a metallurgical vessel, comprising a probe including at least two electrically conducting elements which extend generally mutually parallel, a tubular sheath containing said conducting elements, and an insulator for mutually insulating said elements from one another, wherein said elements have distal ends spaced apart from one another and extending from said insulator of said sheath for contacting liquid metal in a metallurgical vessel when said probe is mounted in a wall of said vessel, comprising the step of:

lengthening said sheath and electrically conducting elements to reduce the diameter of the probe after said sheath and elements have been assembled into an intermediate assembly having a larger cross-sectional area than a final cross section of the lengthened probe.

11. A method according to claim 10, further comprising the step of forming said probe from materials that homogeneously deform along said probe diameter in response to a longitudinal stretching force, and wherein said lengthening step is implemented by the application of said stretching force.

12. A metallurgical plant, comprising:

a metallurgical vessel having a refractory lining for containing metal, and a probe including at least two electrically conducting elements which extend generally mutually parallel, a tubular sheath containing said conducting elements, and an insulator for mutually insulating said elements from one another within said sheath, wherein said probe has distal end means flush with an inner surface of said refractory lining for contacting metal in said metallurgical vessel, and a measurement system connected to the proximal ends of the electrically conducting elements for measuring an electrical characteristic of a circuit formed by said elements, which characteristic is dependent upon the length of said elements, wherein the distal end and diameter of said probe has a diameter less than 1 millimeter.

13. A plant according to claim 12, wherein said probe is formed from materials that homogeneously deform along said probe diameter in response to a longitudinal stretching force.

14. An apparatus for continuously measuring the wear of a wall of a metallurgical vessel, comprised of:

a probe including at least two electrically conducting elements which extend generally mutually parallel, a tubular sheath containing said conducting elements, and an insulator for mutually insulating said elements from one another within said sheath, wherein said elements have distal end means spaced apart from one another and substantially flush with said insulator of said sheath for contacting metal in said metallurgical vessel when said probe is mounted in said wall of said vessel, and a measurement system connected to proximal ends of the electrically conducting elements for measuring an electrical characteristic of a circuit formed by said elements, which characteristic is dependent upon the length of said elements, wherein the distal end of the probe has a diameter less than 1 mm.

* * * * *